Dec. 14, 1926.

G. NICOLAI

EVAPORATOR

Filed August 1, 1925    2 Sheets-Sheet 1

1,611,059

WITNESSES

INVENTOR
Gustav Nicolai
BY
ATTORNEYS

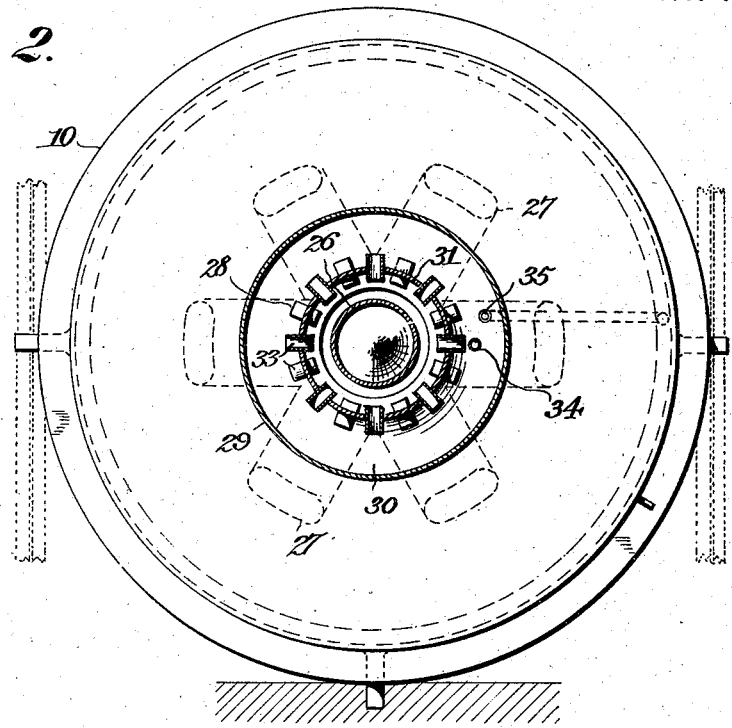
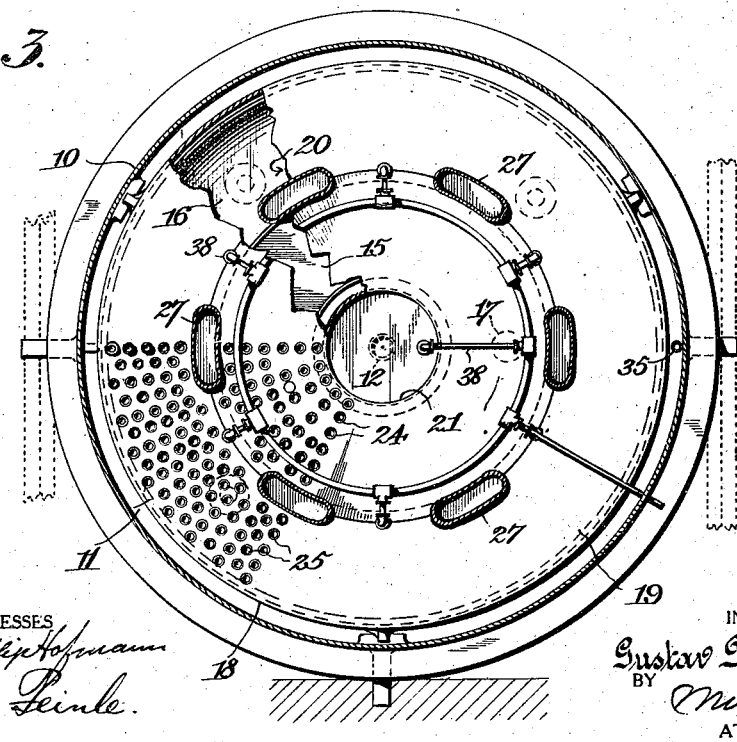

Patented Dec. 14, 1926.

1,611,059

UNITED STATES PATENT OFFICE.

GUSTAV NICOLAI, OF NEW YORK, N. Y.

EVAPORATOR.

Application filed August 1, 1925. Serial No. 47,580.

This invention relates to evaporators, and has especial reference to evaporators used in the concentration of liquids, such as saccharine juices, in the production of sugar.

Some of the objects of the present invention are: to maximize the thermal efficiency as a result of a more effectual distribution of the heat or steam; to obtain a more thorough vaporization of the liquid or juice by causing a novel entrainment of the liquid or juice; to maximize the circulation without any unnecessary conflict between the ebullient liquid and the liquid in the tubes; to obtain a more effectual deflection of the ebullient liquid and vapors so that they will be impinged against a metal body before escaping giving the bubbles carried with the vapors a chance to break; to attenuate the escaping vapor and the ebullient liquid; to cause the particles not capable of gasification to be impinged against a metal body to obtain thorough disintegration, and to make provision for draining condensate, and the liberation of gases and pressure which might interfere with the proper action in the evaporator.

With the foregoing and other objects in view, the invention resides in the particular provision, relative disposition and functions of the parts hereinafter fully described and illustrated in the accompanying drawings, in which—

Fig. 2 is a horizontal sectional view taken on the line 2—2 of Fig. 1, looking in the direction indicated by the arrows.

Fig. 3 is a horizontal sectional view taken substantially on the line 3—3 of Fig. 1, and looking in the direction indicated by the arrow.

Figure 1:
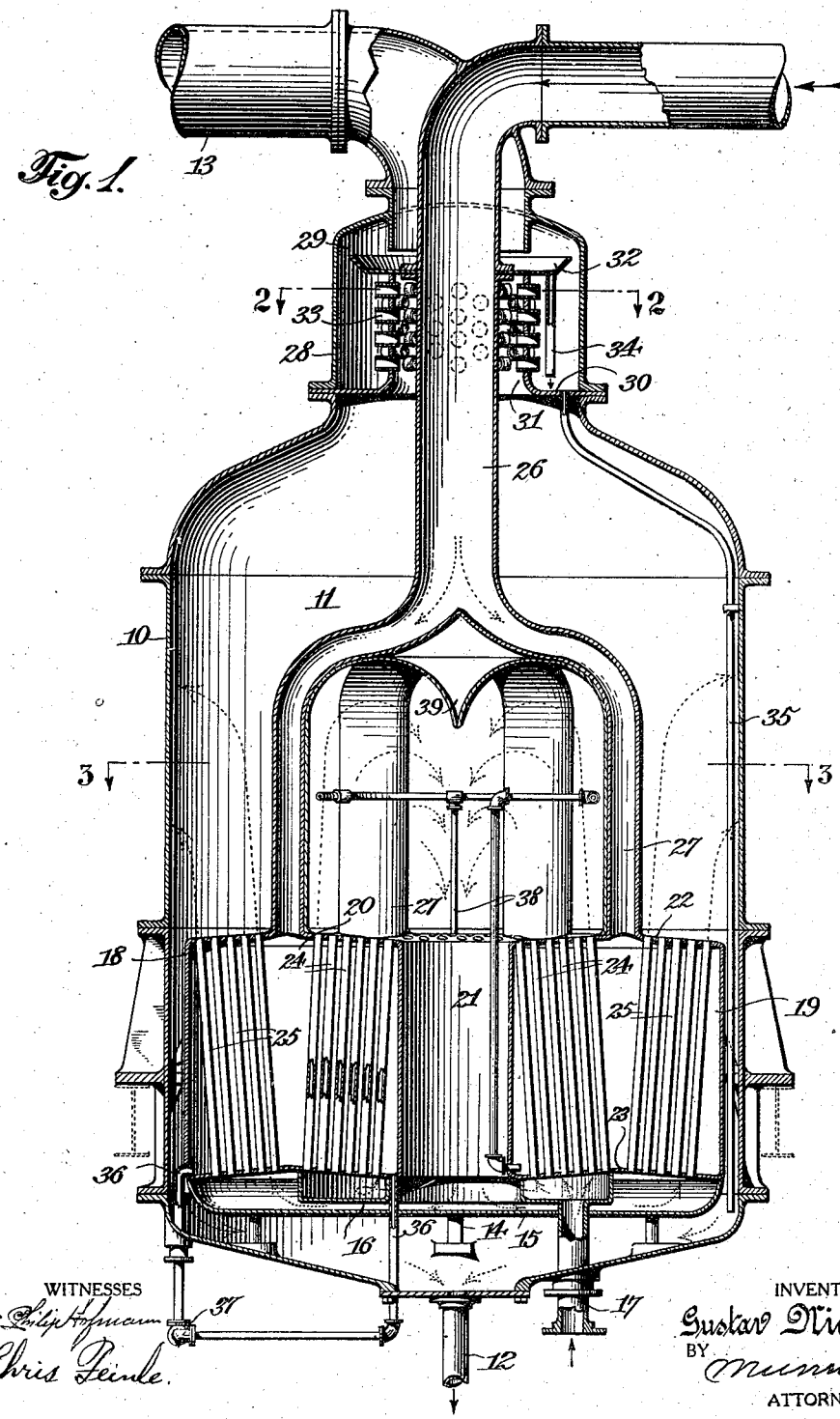
Figure 1 is a vertical sectional view through the evaporator of the present invention.

Referring now more particularly to the several views of the drawing for all of the details, it will be apparent that, the evaporator of the present invention will include a vessel or cell 10 which may be of any desired construction and size consistent with the arrangement of the other parts arranged within the chamber 11 of the vessel or cell 10. Communicating with the chamber 11 is a liquid or syrup outlet 12 and a vapor outlet 13 which leads to a vacuum pan. Supported in any suitable manner as at 14 is a pan or receptacle 15, and supported above the receptacle 15 to any preferred degree is a pan or receptacle 16 of annular construction. Leading to the receptacle 16 is a liquid inlet 17. Superposing the receptacles 15 and 16 is a calandria 18. The calandria, in the present embodiment, consists of a hollow body or shell 19 annular in construction, to provide a chamber 20 and a passage 21 located centrally of the shell, and substantially centrally of the chamber 11. Arranged between and opening through the walls 22 and 23 of the shell 19 is an annular series of tubes 24 which are nested together as closely as possible. It will be noted that these tubes are disposed at an angle with respect to a vertical plane and are inclined upwardly and inwardly with respect to the central vertical axis of the vessel 10. It will be further noted that the lower ends of the tubes 24 are opened to the receptacle 16. Surrounding the series of tubes 24 is an annular series of tubes 25 which are arranged between the walls 22 and 23 and open therethrough. The tubes 25 are arranged at an angle with respect to a vertical plane and are inclined upwardly and outwardly with respect to the central vertical axis of the vessel 10. It will be further noted that the lower ends of the tubes 25 are opened to the receptacle 15, and that the upper ends of the tubes 25 are opened to the chamber 11 similarly to the tubes 24.

In order to heat the tubes 24 and 25, in the present instance, there is provided a steam conduit 26 which enters the chamber 11 and has a number of branch conduits 27, there being six in the present instance, each of which communicates with the chamber 20 of the shell 19. It will be noted that each branch conduit 27 communicates with the chamber 20 between the inner series of tubes 24 and the outer series of tubes 25, as shown most clearly in Fig. 1. The showing in Fig. 3, for the sake of clearness has omitted certain of the tubes, which it is to be understood occur all around the inside of the shell 19.

In order to deflect or to cause the impingement of any particles which have not been disintegrated in the chamber 11, there is provided at the top of the chamber 11 a means 28 for that purpose. The said means 28 in the present instance consists of a casing 29 which provides a bottom 30 and a flue 31 which surrounds the conduit 26. A pan or receptacle 32 is arranged on the top of the flue 31 and closes the upper end thereof. Radiating from the wall of the flue 31 are short tubes 33 which establish communication between the chamber 11 and the outlet 13. Any condensate falling into the receptacle 32 is drained therefrom by a drain pipe 34, and any condensate in the chamber of the casing 29 is drained therefrom by virtue of a drain pipe 35 which communicates with the interior of the casing 29 and leads to the bottom of the chamber 11.

In order to drain any condensate in the chamber 20 there is provided a number of tubes 36 which communicate with said chamber and lead to a common outlet pipe 37. Air and gas outlet pipes 38 are also employed for liberating the same from the chamber 20 when steam is first introduced to the chamber 20.

The action of the evaporator is as follows: The liquid or saccharine juice enters the receptacle 16 through the inlet 17 and rises in the lower ends of the tubes 24. Steam is admitted to the chamber 20 which will cause the liquid in the tubes 24 to move upwardly and out through the upper ends of the tubes 24 due to the difference in temperature of the liquid and the heat retained by the tubes 24. The liquid in a condition of ebullition courses upwardly and inwardly owing to the disposition of the tubes is deflected in part by a baffle 39; the vapor rising and the remnant falling through the passage 21 to the receptacle 15 from which it enters the lower ends of the tubes 25. The liquid entering the lower ends of the tubes 25 will have cooled to some extent and being brought into the presence of the heated tubes 25 will move upwardly and outwardly of the chamber 11; the vapor rising and any remnant will pass downwardly to the bottom of the vessel 10 and will pass out through the outlet 12. The vapor passes upwardly and is attenuated and kept from condensing by the heat of a portion of the conduit 26, while the ebullient liquid is constantly heated by the branch conduits 27 thus maximizing vaporization. All of the vapor passes through the tubes 33 to the outlet 13 from which it passes to the vacuum pan. Any particles carried up by the vapor will be impinged against the wall of the casing 29 to cause further separation from the vapor.

From the foregoing it should be obvious that loss of heat by radiation is reduced to the minimum; that choking of the tubes 24 and 25 is prevented due to the manner in which the liquid is sent out of the tubes; and that air will be almost entirely excluded.

I claim:

1. In an evaporator for concentrating a liquid, a closed vessel having a vapor outlet and a condensate outlet; liquid controlling means within the vessel for controlling the circulation of the liquid delivered thereto, said liquid controlling means including sets of tubes in the same horizontal plane and bearing a diverging relationship to each other to direct jets of liquid in groups in opposite directions; and heating means for heating the tubes.

2. In an evaporator for concentrating a liquid, an ebullition chamber having a vapor outlet and a condensate outlet; liquid receptacles, one of said receptacles having a liquid inlet, sets of tubes opened respectively to said liquid receptacles and to the ebullition chamber, and heat conducting means for heating the tubes.

3. In an evaporator for concentrating a liquid, an ebullition chamber having a vapor outlet and a condensate outlet; liquid receptacles, one of said receptacles having a liquid inlet, sets of tubes opened respectively to said liquid receptacles and to the ebullition chamber, heat conducting means for heating the tubes, said heat conducting means comprising a heat chamber through which said tubes extend, and a heat conduit communicating with said heat chamber.

4. In an evaporator for concentrating a liquid, an ebullition chamber having a vapor outlet and a condensate outlet; liquid receptacles, one of said receptacles having a liquid inlet, sets of tubes opened respectively to said liquid receptacles and to the ebullition chamber, heat conducting means for heating the tubes, said heat conducting means comprising a heat chamber through which said tubes extend, and a heat conduit communicating with said heat chamber, said heat conduit extending through said ebullition chamber.

5. In an evaporator for concentrating a liquid, an ebullition chamber having a vapor outlet and a condensate outlet; liquid receptacles, one of said receptacles having a liquid inlet, sets of tubes opened respectively to said liquid receptacles and to the ebullition chamber, heat conducting means for heating the tubes, said heat conducting means comprising a heat chamber through which said tubes extend, and a heat conduit having branch conduits which communicate with said heat chamber.

6. In an evaporator for concentrating a liquid, an ebullition chamber having a vapor outlet and a condensate outlet; liquid receptacles, one of said receptacles having a liquid inlet, inner and outer sets of tubes opened respectively to said liquid receptacles and to the ebullition chamber, and heat conducting means for heating the tubes.

7. In an evaporator for concentrating a liquid, an ebullition chamber having a vaport outlet and a condensate outlet; liquid receptacles, one of said receptacles having a liquid inlet, diverging sets of tubes opened respectively to said liquid receptacles and to the ebullition chamber, and heat conducting means for heating the tubes.

8. In an evaporator for concentrating a liquid, an ebullition chamber having a vapor outlet and a condensate outlet; liquid receptacles, one of said receptacles having a liquid inlet, inner and outer sets of tubes opened respectively to said liquid receptacles and to the ebullition chamber; and heat conducting means for heating the tubes, said heat conducting means comprising a heat chamber and a heat conduit extending through said ebullition chamber and having branch conduits which communicate with said heat chamber between the inner and outer sets of tubes which extend through said heat chamber.

9. In an evaporator for concentrating a liquid, an ebullition chamber having a vapor outlet and a condensate outlet; liquid receptacles, one of said receptacles having a liquid inlet, inner and outer sets of tubes opened respectively to said liquid receptacles and to the ebullition chamber, and heat conducting means for heating the tubes, said heat conducting means comprising a heat chamber and a heat conduit extending through said ebullition chamber and having branch conduits which communicate with said heat chamber between the inner and outer sets of tubes which extend through said heat chamber in diverging relationship with respect to each other.

10. In an evaporator for concentrating a liquid, an ebullition chamber having a vapor outlet and a condensate outlet; liquid receptacles, one of said receptacles having a liquid inlet, sets of tubes opened respectively to said liquid receptacles and to the ebullition chamber, heat conducting means for heating the tubes, and a series of radially and horizontally disposed tubes between the vapor outlet and the ebullition chamber.

11. An evaporator for concentrating saccharine juice in the production of sugar, including a closed vessel, and means for simultaneously heating and causing the juice in jets to move first radially inward to the center of the vessel and then radially outward against the wall of the vessel.

GUSTAV NICOLAI.